(12) United States Patent
Spruce

(10) Patent No.: US 10,202,964 B2
(45) Date of Patent: Feb. 12, 2019

(54) METHOD OF YAWING A ROTOR OF A WIND TURBINE

(75) Inventor: Chris Spruce, Leatherhead (GB)

(73) Assignee: Vestas Wind Systems A/S, Aarhus N. (DK)

(*) Notice: Subject to any disclaimer, the term of this patent is extended or adjusted under 35 U.S.C. 154(b) by 1317 days.

(21) Appl. No.: 14/129,400

(22) PCT Filed: Jul. 3, 2012

(86) PCT No.: PCT/DK2012/050246
§ 371 (c)(1),
(2), (4) Date: Feb. 10, 2014

(87) PCT Pub. No.: WO2013/004244
PCT Pub. Date: Jan. 10, 2013

(65) Prior Publication Data
US 2014/0152013 A1 Jun. 5, 2014

Related U.S. Application Data

(60) Provisional application No. 61/504,262, filed on Jul. 4, 2011.

(30) Foreign Application Priority Data

Jul. 4, 2011 (DK) ................................ 2011 70357

(51) Int. Cl.
*F03D 7/04* (2006.01)
*F03D 7/02* (2006.01)

(52) U.S. Cl.
CPC ........... *F03D 7/0204* (2013.01); *F03D 7/042* (2013.01); *F05B 2270/309* (2013.01);
(Continued)

(58) Field of Classification Search
CPC .............. F03D 7/0204; F05B 2270/321; F05B 2270/329; F05B 2270/701
See application file for complete search history.

(56) References Cited

U.S. PATENT DOCUMENTS 4,298,313 A 11/1981 Hohenemser
5,178,518 A 1/1993 Carter, Sr.
(Continued)

FOREIGN PATENT DOCUMENTS

EP 1890034 A1 2/2008
EP 2143939 A1 1/2010
(Continued)

OTHER PUBLICATIONS

European Patent Office, Official Action issued in Application No. 12 735 083.3 dated Apr. 27, 2015.
(Continued)

*Primary Examiner* — Christopher M Koehler
(74) *Attorney, Agent, or Firm* — Wood Herron & Evans LLP

(57) ABSTRACT

A wind turbine (1) in which the yaw speed of a rotor (4) of the wind turbine (1) is increased, in a direction to reduce yaw error, from a first speed to a faster second speed when at least one of a yaw error threshold and a rate of change in yaw error threshold is exceeded. Yaw error is an amount an axis about which the rotor (4) is rotatable is offset from the wind direction to which the rotor (4) is exposed. As a result, the maximum loads that a wind turbine 1 should withstand may be reduced and lighter wind turbine components result.

15 Claims, 6 Drawing Sheets

(52) U.S. Cl.
CPC ... *F05B 2270/321* (2013.01); *F05B 2270/329* (2013.01); *F05B 2270/701* (2013.01); *Y02E 10/723* (2013.01)

(56) References Cited

U.S. PATENT DOCUMENTS

| | | | | |
|---|---|---|---|---|
| 5,990,568 | A * | 11/1999 | Hildingsson | F03D 7/0204 290/44 |
| 2004/0183307 | A1 * | 9/2004 | Yoshida | F03D 7/0204 290/44 |
| 2006/0205554 | A1 * | 9/2006 | Nohara | F03D 7/0204 475/179 |
| 2007/0098549 | A1 * | 5/2007 | Nies | F03D 80/00 416/44 |
| 2010/0054939 | A1 * | 3/2010 | Hoffmann | F03D 7/0204 416/10 |
| 2010/0080702 | A1 * | 4/2010 | Matsuo | F03D 7/0204 416/1 |
| 2010/0144483 | A1 * | 6/2010 | Aiyakkannu | F03D 1/00 475/225 |
| 2012/0027589 | A1 * | 2/2012 | Haag | F03D 1/008 416/1 |
| 2012/0139248 | A1 * | 6/2012 | Bertolotti | F03D 7/0204 290/44 |
| 2013/0004312 | A1 * | 1/2013 | Friedrich | F03D 7/0204 416/1 |

FOREIGN PATENT DOCUMENTS

| | | |
|---|---|---|
| EP | 2159415 A2 | 3/2010 |
| EP | 2175127 A2 | 4/2010 |
| EP | 2208886 A2 | 7/2010 |
| EP | 2290230 A2 | 3/2011 |
| JP | 2007198167 A | 8/2007 |
| WO | 2010100271 A2 | 9/2010 |

OTHER PUBLICATIONS

European Patent Office, International Search Report and Written Opinion issued in International application No. PCT/DK2012/050246 dated Feb. 7, 2013.

Danish Patent and Trademark Office, Search Report issued in Application No. PA 2011 70357 dated Feb. 15, 2012.

Danish Patent and Trademark Office, Written Opinion issued in Application No. PA 2011 70357 dated Feb. 17, 2012.

* cited by examiner

METHOD OF YAWING A ROTOR OF A WIND TURBINE

BACKGROUND OF THE INVENTION

The invention relates to a wind turbine, and in particular a method of yawing a rotor of a wind turbine.

A typical known wind turbine 1 is illustrated in FIGS. 1 and 2. It comprises a wind turbine tower 2 on which a wind turbine nacelle 3 is mounted. A wind turbine rotor 4 comprising wind turbine blades 5 is mounted on a hub 6. The hub 6 is connected to the nacelle 3 through a low speed shaft (not shown) extending from the nacelle front. The low speed shaft is connected to a gearbox that drives a high speed shaft and the high speed shaft drives a generator (not shown). In large wind turbines suitable for use in large scale electricity generation on a wind farm, for example, the diameter of the rotor can be as large as 100 meters or more and the mass of the nacelle, blades and hub on top of the tower is considerable and can be a few hundred tons or more. The rotor rotates about a rotational axis shown by the dashed line.

The example wind turbine 1 of FIG. 1 is an Active Stall (registered trade mark) wind turbine. When this type of wind turbine 1 is generating power and its generator is about to be overloaded, its blades 5 are pitched into the wind. That is to say, the angle of attack of the blades 5 is increased to induce stall or to cause a deeper stall. Pitch is the rotation of a blade 5 about its longitudinal axis as illustrated by the arrows 7 in FIG. 2. The blades 5 are typically pitched using a hydraulic system or electric motors (not shown).

The rotation of the nacelle 3 and rotor 4 about the longitudinal axis of the wind turbine tower 2 is called yaw, and this is illustrated by arrow 8 in FIG. 2. Wind turbines 1 generate power most efficiently when the rotor 4 of the wind turbine 1 is perpendicular to the wind direction or, in other words, the axis about which the rotor rotates is parallel to the wind direction, and wind turbines are rotated or yawed to face the wind. However, in upwind turbines, where the rotor 4 is upwind of the tower 2 such as the wind turbine 1 illustrated in FIGS. 1 and 2, as the wind direction is constantly changing, the nacelle has to be turned to face the rotor 4 to be perpendicular to the wind direction. To do this, the nacelle 3 is yawed by a powered actuator, such as an electric motor or motors operating at a single speed. This powered actuator does not operate continuously, and at times when the nacelle is not being yawed by the powered actuator, brakes (not shown) are typically provided to prevent the nacelle from being blown away from this optimum position.

FIG. 3 shows a typical yaw system 50 for yawing a wind turbine 1 such as that of FIGS. 1 and 2. The yaw system 50 comprises a drive mechanism 52 and a controller (not shown) for controlling the drive mechanism 52. In this example, the drive mechanism 52 comprises a pair of motors 54 (and, in particular electric motors) each with a pinion or small toothed gear 56 mechanically connected to its shaft 58. Bodies 60 of the motors 54 are mechanically connected to the nacelle 3 (shown as the dashed lines in FIG. 3). The motors 54 are spaced apart around the circumference of and the teeth 62 of the pinions 56 of the motors 54 engage with a yaw ring 64, which is a large ring with a toothed circumference (inner circumference 66, in this example) mechanically connected to the wind turbine tower 2. In use, when the motors 54 are operated by the controller so their shafts 58 rotate, the pinions 56 rotate and move around the yaw ring 64 causing the nacelle 3 and its rotor 4 to yaw. In known systems, the yaw rate is constant and typically around 0.3°/s.

Yawing, particularly in large wind turbines 1, is slow because, as mentioned above, large wind turbine nacelles 3 are very heavy, typically a few hundred tons. Again, because of the high weight of the nacelles 3 of large wind turbines 1 a lot of energy is required to yaw them.

Yaw error is the angle between the plane the rotor 4 is in and the wind direction to which the rotor 4 is exposed. In other words, the yaw error is the angle between the rotational axis of the rotor and the wind direction. The nacelle points in the direction of the rotational axis of the rotor and so the yaw error is also the difference between the wind direction and the direction in which the nacelle is pointing.

Extreme changes in wind direction result in high yaw errors and the wind turbine 1 being exposed to very high loads. Indeed, being able to withstand such loads, so called blade flap extreme loads, are the loads that drive the design of wind turbines. The required strength is typically achieved at a cost of increased weight and expense of wind turbine components, such as blades, hub, shaft, tower and foundations. However, these very high loads may occur infrequently, for example, once every year and under particularly high loads, a typical wind turbine would have to be shut down.

The wind turbine arrangement of U.S. Pat. No. 4,298,313 uses an electric motor to yaw the rotor to increase the offset between the rotor axis and the wind direction as wind speed increases. Downwind turbines, such as that disclosed in U.S. Pat. No. 5,178,518, in which the turbine is downstream of the turbine tower, can yaw downwind automatically, without actuation, by wind blowing on vanes projecting from the nacelle. Brakes can be applied to reduce the yaw speed. Brakes are also used to reduce yaw speed in the wind turbine disclosed in European patent application No. EP 1890034. Rotary dampers can also be used to reduce yaw speed, such as disclosed in Japanese patent application No. JP 2007198167.

The inventor of the present application is the first to appreciate that by increasing yaw speed of a rotor of a wind turbine, in a direction to reduce yaw error towards zero or to zero and such that the rotor faces upwind, from a first speed to a faster second speed when at least one of a yaw error threshold and a rate of change in yaw error threshold is exceeded, that extreme loads can be significantly reduced. In other words, the yaw speed of rotation is increased to rapidly reduce yaw error when the yaw error and/or change in yaw error is high or above a predetermined threshold. As a result, the yaw error, which causes high loads, is reduced during extreme changes in wind direction. As such, the maximum loads that a wind turbine should withstand may be reduced and lighter and cheaper wind turbine components result. An increased moving yaw speed of rotation or rapid rotation may be achieved in many different ways. It is preferably achieved by operating electric motors which yaw the turbine rotor at a higher rotational speed than normal, which may be above the rated speed of the motor, for a short time period. Because these extreme gusts of wind are experienced so rarely, the higher rotational speed is also only rarely used and the rotor and nacelle may yaw at normal speeds most of the time (for example, more than 90% of the time).

SUMMARY OF THE INVENTION

The invention in its various aspects is defined in the independent claims below. Advantageous features are defined in the dependent claims below.

A preferred embodiment of the invention is described in more detail below and takes the form of a wind turbine in which the yaw speed of a rotor of the wind turbine is increased, in a direction to reduce yaw error, from a first speed to a faster second speed when at least one of a yaw error threshold and a rate of change in yaw error threshold is exceeded. Yaw error is an amount an axis about which the rotor is rotatable is not parallel to wind direction to which the rotor is exposed.

As a result, the maximum loads that a wind turbine should withstand may be reduced and lighter wind turbine components result.

According to the invention in a first aspect, there is provided a method of yawing a rotor of a wind turbine, the method comprising: increasing yaw speed of a rotor of a wind turbine, in a direction to reduce yaw error, from a first speed to a faster second speed when at least one of a yaw error threshold and a rate of change in yaw error threshold is exceeded, yaw error being an amount an axis about which the rotor is rotatable is offset from wind direction to which the rotor is exposed.

In this way, extreme loads experienced by a wind turbine may be reduced. As such, examples of the present invention provide a lighter wind turbine rotor and a typical 15% reduction in the cost of each wind turbine blade. Because of this, examples of the present invention provide a lighter and cheaper wind turbine tower, foundations, hub, main shaft, tower top, main frame and yaw system due to the lighter rotor and reduced tilt extreme loads. As a result, examples of the present invention are estimated to provide a 3.1% reduction of wind turbine cost of energy. Furthermore, examples of the present invention reduce or even eliminate "extreme flap moment protection" alarms.

Preferably, the second speed is between substantially 3 times and substantially 20 times faster than the first speed, more preferably between substantially 5 times and 15 times faster than the first speed, and most preferably substantially 10 times faster than the second speed.

Preferably, the first speed is substantially 0.3 degrees per second.

Preferably, blades of the wind turbine rotor are pitchable to induce stall.

Preferably, the method comprises controlling at least one motor to increase the yaw speed of the rotor, and most preferably, the at least one motor is an electric motor.

According to the invention in a second aspect, there is provided a controller for a wind turbine comprising means for implementing the method described above.

According to the invention in a third aspect, there is provided a computer program for implementing the method described above.

According to the invention in a fourth aspect, there is provided a computer program product, comprising a computer usable medium having a computer readable program code embodied therein, said computer readable program code adapted to be executed to implement the method described above.

According to the invention in a fifth aspect, there is provided a wind turbine comprising the controller, the computer program, or the computer program product as described above.

BRIEF DESCRIPTION OF THE DRAWINGS

Preferred embodiments of the invention will now be described, by way of example, and with reference to the drawings in which.

DETAILED DESCRIPTION OF PREFERRED EMBODIMENTS

Figure 3:
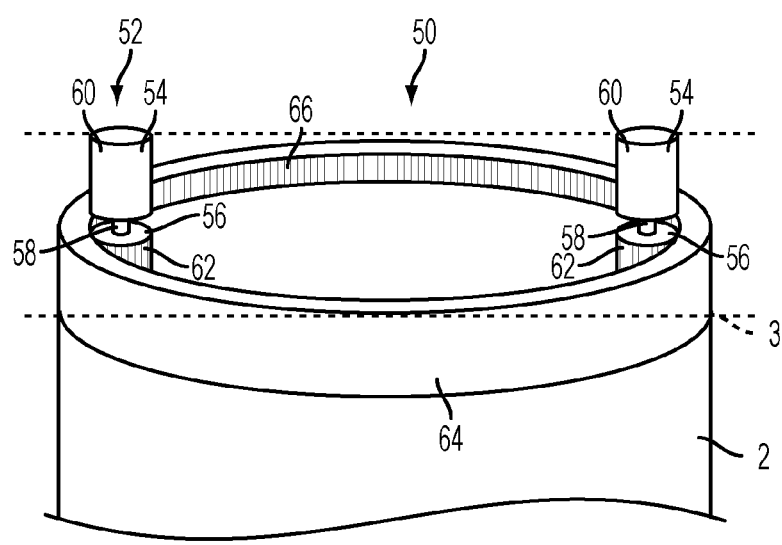
FIG. 3 is a schematic isometric view of a wind turbine component of the wind turbine of FIG. 1 and FIG. 2.
Figure 4:
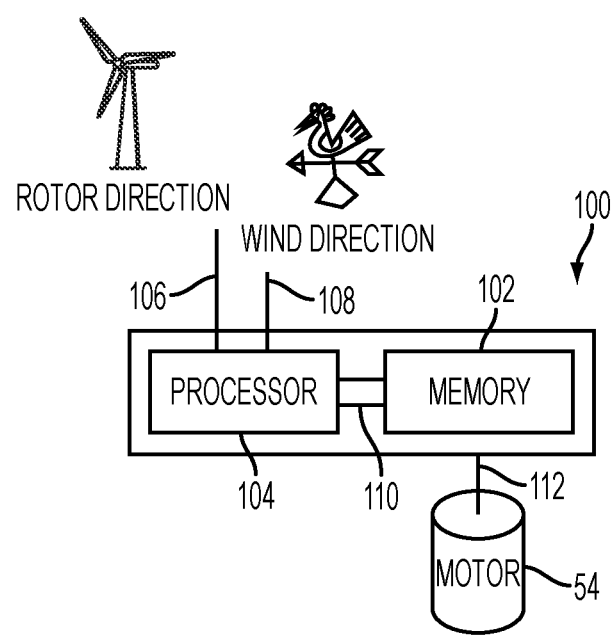
FIG. 4 is a schematic view of a controller of an example of the present invention.

FIG. 4 illustrates an example controller 100 for an upwind wind turbine 1 for controlling or implementing a method for controlling a yaw system of the wind turbine 1, such as that of FIG. 3.

The controller 100 includes means for implementing the method comprising a memory 102 and a processor 104. The method implemented on the processor may be implemented in hardware or software. The processor 104 has an input 106 for the direction the rotor 4 faces and an input for the wind direction 108 to which the wind turbine 1 is exposed. The direction the rotor 4 faces is measured through sensors (not shown) located around the yaw ring 64 in a known arrangement. The wind direction is measured by a wind vane (not shown), which is a known arrangement. The processor 104 is in communication connection with memory 102 via connection 110. The controller 100 is in communication connection via connection 112 with the motors 54. The wind direction may also be measured by a LIDAR device (Light Detection And Ranging).

In use, under control of processor 104, the memory 102 periodically (for example, a plurality of times per second) stores the direction the rotor 4 faces and the wind direction. Periodically (again, for example, a plurality of times per second), an indication of the direction the rotor 4 faces and the wind direction are passed along the connection 110 to the processor 104.

Figure 5:
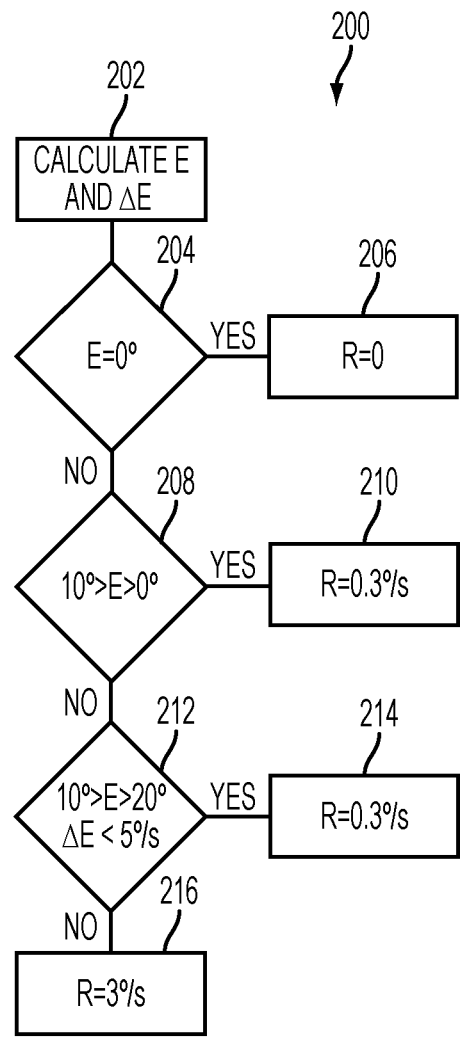
FIG. 5 is a flow diagram illustrating the operation of the controller of FIG. 4.

The operation of the processor 104 is illustrated in the flow diagram 200 of FIG. 5. First, illustrated at 202, the processor 104 calculates the yaw error E and the change in yaw error ΔE over time as follows. Yaw error is calculated by calculating the difference between the direction the rotor 4 faces and the wind direction. The yaw error is transmitted to memory 102 and is stored in it. The rate of change in yaw error is calculated by calculating the difference between the yaw error previously stored in the memory 102 and the current yaw error.

The processor 104 of the controller 100 controls yaw angle of the rotor 4 of the wind turbine 1 to increase yaw speed of the rotor 4 of the wind turbine 1, in a direction to reduce yaw error, from a first speed to a faster second speed, typically above the rated speed of the motor or motors yawing the rotor 4, but for a short time, when at least one of a yaw error threshold and a rate of change in yaw error threshold exceeded.

In order to do this, the example processor 104 of the controller 100 illustrated in FIG. 4 operates as follows. As shown at 204 in FIG. 5, if yaw error E=0° then the processor 104 signals motors 54 not to rotate or rotate at a speed R=0 (206). If yaw error is small, for example, E is between 0° and 10° (208 in FIG. 4), then via connection 112 the processor 104 instructs the motors 54 to rotate in a direction to reduce E at a slow, normal or rated speed, for example, 0.3°/s (210). If yaw error is larger, but still quite small, for example, E is between 10° and 20° and the rate of change in yaw error is also quite small, for example, ΔE is less than 5°/s (212), then via connection 112 the processor 104 also instructs the motors 54 to rotate in a direction to reduce E at a slow, normal or rated speed, for example, 0.3°/s. However, if yaw error is even larger, and/or the change in yaw error is particularly large then via connection 112 the processor 104 instructs the motors 54 to rotate in a direction to reduce E at a faster or above-rated speed, for example, 3°/s. This occurs, for example as illustrated at 212, if E is between 10° and 20° and/or the change in yaw error is large, for example, ΔE is more than 5°/s (the yaw error threshold and/or rate of change of yaw error threshold is exceeded). In alternative examples, the rotor yaws faster only if a rate of change of yaw error threshold is exceeded; the value of yaw error is irrelevant.

Figure 6A:
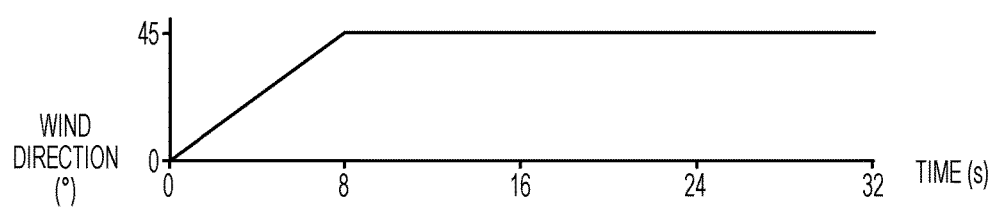
FIG. 6a is a graph of wind direction against time (t).
Figure 6B:
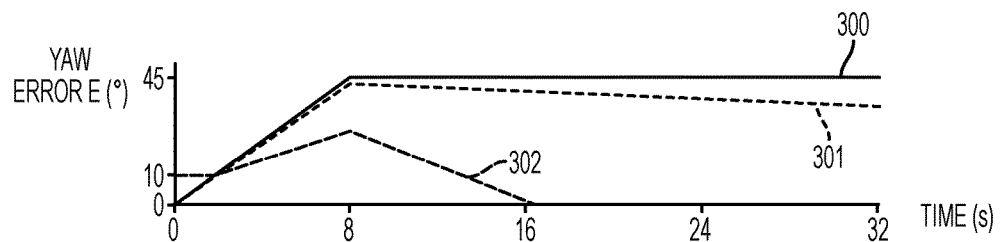
FIG. 6b is a graph of yaw error (E) against time (t) for a known wind turbine and for a wind turbine example of the present invention.

FIGS. 6a and 6b illustrate the difference between the operation of a known system and an example system of the present invention and illustrates advantages of the present invention. FIG. 6a shows a change in wind direction against time. In FIG. 6a, between time t=0 and t=8 seconds, the wind direction changes by 45 degrees. The response of the wind turbine is shown in FIG. 6b.

In FIG. 6b, the solid line 300 illustrates the operation of a wind turbine with no yaw system at all as an example. As there is no yaw system, the nacelle cannot yaw into the oncoming wind direction, and the yaw error E is 45° at t=8 s, and remains at 45°.

The dotted line 301 illustrates a known yaw system with a constant yaw rate of 0.3°/s in this example. The wind direction changes by 45° over 8 seconds which is a rate of change of wind direction of 5.6°/s. With the yaw system operating at 0.3°/s the yaw error E will experience a rate of change of 5.3°/s (i.e. 5.6°/s−0.3°/s). Therefore, at t=8 s, which will be the highest yaw error E the turbine experiences, E is 42.6°. After t=8 s, the wind direction does not change and the value of E reduces at 0.3°/s and so to reach E=0 will take 142 seconds.

The dashed line 302 illustrates an example of the present invention. Between E=0° and E=10° when the yaw error is small, the nacelle is yawed in a direction to reduce E at 0.3°/s according to steps 208 and 210 of FIG. 5. As the rate of change of yaw error ΔE is greater than 5°/s (i.e. ΔE is 5.6°/s), after E=10° the motors 54 operate at high or above-rated speed to rapidly reduce yaw error E at 3°/s according to steps 212 and 216 of FIG. 5. Therefore, the maximum yaw error E according to this invention is approximately 26° which occurs at t=8° s. After t=8 s, the wind direction does not change and the value of E reduces at 3°/s and so to reach E=0 takes approximately 9 seconds.

As can be seen from FIG. 6b, the maximum yaw error experienced by the turbine is reduced from 42.6° or 26°, as compared to a known yaw system. Further, the time it takes for the yaw error to reach zero is reduced according to the invention as compared to a known yaw system. Certain extreme loads acting on a wind turbine (such as blade root bending moment, tower base bending moment among others) are driven by the maximum yaw error. As the maximum yaw error is significantly reduced according to the invention, the loads that the turbine experiences are also reduced.

The example shown in FIGS. 5 and 6b has been simplified. In practice, there would be a hysteresis delay of 10° (for example) of yaw error before yawing begins.

It will be appreciated that this is a simple example to illustrate the invention. Other simple control strategies may be used to yaw faster when yaw error is larger and, in particular, when yaw error is large and increasing rapidly. For example, a proportional integral derivative (PID) controller may be used.

While yawing and high speed yawing have been described as achieved by operating a pair of motors, they can be achieved in other ways. For example, by using a single motor, or other numbers of plural motors, for example between three and ten motors. The yaw ring 64 may have teeth around its outer circumference and pinions of motors 54 may engage with these teeth in order to yaw the wind turbine's rotor 4.

While high speed yawing has been has been described by running a single or plurality of existing motors above their rated level, the effect can be achieved in other ways. For example, two-speed motors can be used, which have a number of poles for operating at normal or slow speed and more poles to operate the motor at high speed. Variable speed drives could be used for yawing at different speeds. Motors with different operating speeds could be used, such that one motor or set of motors operates to yaw at normal speed and another motor or set of motors operates to yaw at high speed.

Figure 1:
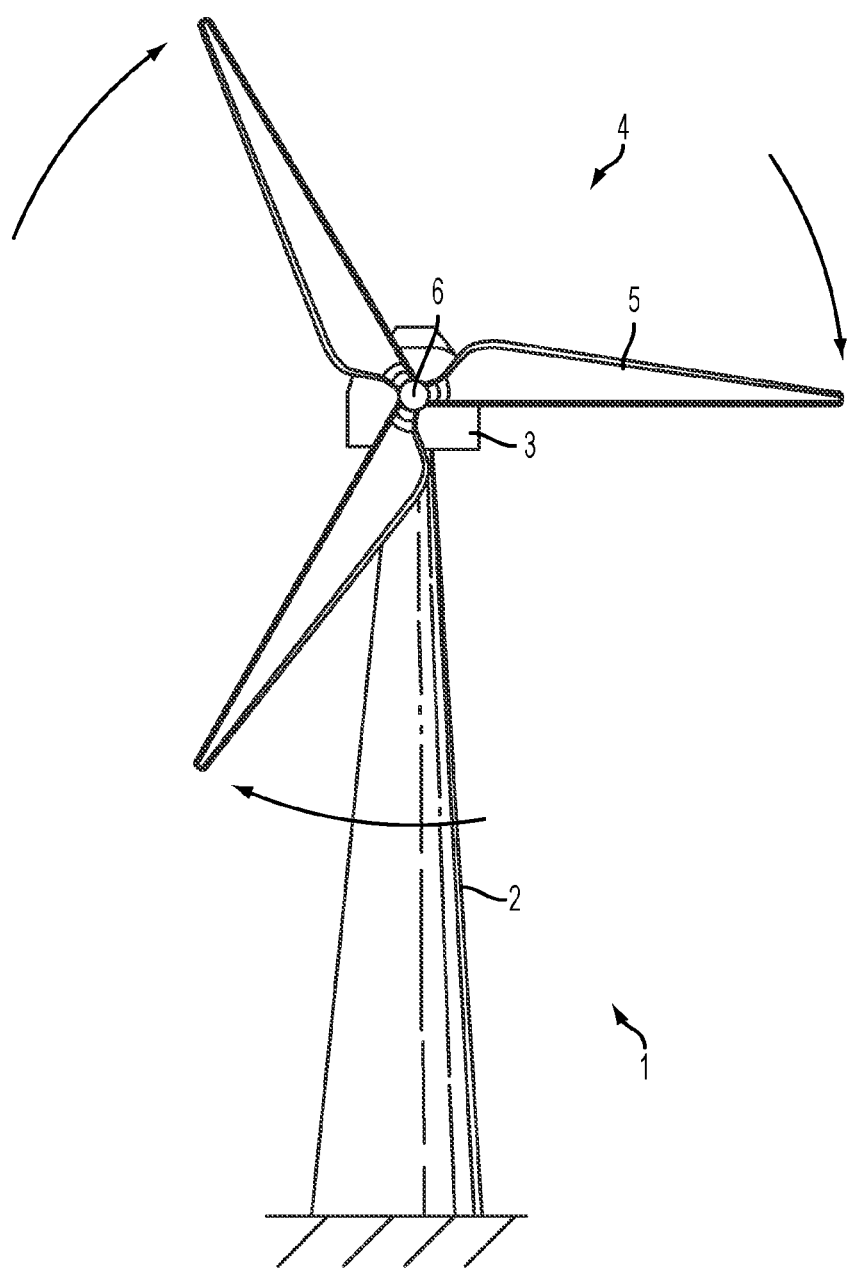
FIG. 1 is a side view of a known wind turbine.
Figure 2:
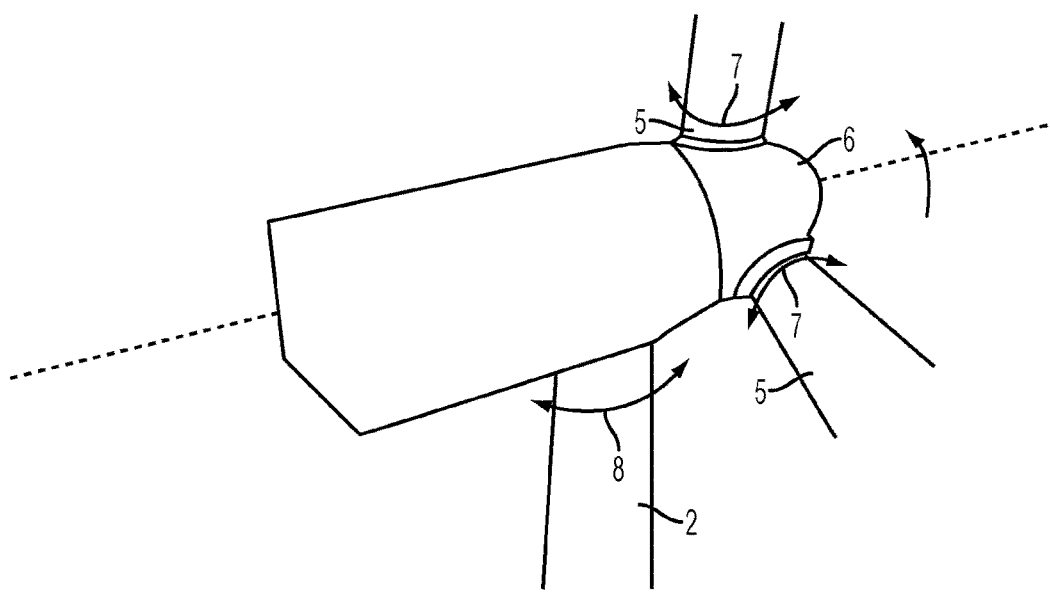
FIG. 2 is an isometric view of a portion of the wind turbine of FIG. 1.

This system is particularly beneficial for an Active Stall (registered trade mark) wind turbine, such as that of FIGS. 1 and 2, in which blades of the wind turbine rotor are pitchable to induce stall. This is because, in the case of an Active Stall turbine, the blade design is dominated by the change-of-wind-direction case causing high extreme loads.

Reliability in the system including MTBI (mean time between inspections), MTBF (mean time between failure) and availability of a wind turbine may be improved as discussed below. Reliability is more important the more a wind turbine is inaccessible, for example, if it is located offshore.

Reliability may be improved by including various additional components (such as sensors, for example those located around the yaw ring, and actuators, such as yaw drives) in the wind turbine to provide redundancy.

For sensor systems, for example, rather than an individual sensor, multiple sensors and typically an odd number of sensors, for example, three are provided. Voting procedures are used between the sensors such that the indication of a majority of sensors (in this case, two) of the sensors is considered the correct indication. This provides various advantages such as allowing a faulty sensor to be identified (thus, the faulty sensor can be scheduled for repair/replacement at the next convenient opportunity, preferably the next scheduled service visit) and allowing the turbine to continue to operate with a faulty sensor.

For actuation systems, such as a yaw drive, rather than a single actuator an additional, redundant, actuator or actuators are provided such that if one actuator fails, another one or more can be used additionally or instead to keep the wind turbine in operation, optionally, with a reduced operational envelope. By way of example, for purposes of illustration, a turbine with six yaw drives may have a seventh added. All seven would be rated at the power/load levels needed to operate the turbine with only six drives and in normal operation six drives would operate. In the event of one drive failing, the seventh drive would be brought into operation and the turbine would continue to operate. The failure would be notified to the service department and the failed drive could be replaced. When the drive is replaced may depend on a number of factors, such as the access to the turbine (it may be offshore, for example), probability of failure of a further drive, and the next scheduled visit to the turbine. In another arrangement all seven drives would be used in normal operation, so that they are all operating at lower-than-design power/load levels and when one drive fails the remaining six operate at their design/load levels. This arrangement may improve or maximise the lifetime of the yaw drive system.

Other actuation systems and components benefit from installation of redundant components, for example, cooling systems, cooling system pumps, cooling fans (for example, in electrical cabinets), heating systems (for example, gearbox heaters, and heaters in electrical cabinets), hydraulic pumps, pitch system actuators, trailing edge flaps, and microtabs on blades.

The invention has been described with reference to example implementations, purely for the sake of illustration. The invention is not to be limited by these, as many modifications and variations would occur to the skilled person. For example, although the invention has been described with particular reference to a large wind turbine with a rotor as large as 100 meters or more, it is also applicable to a small model intended for domestic or light utility usage. The method implemented by the controller installed in the wind turbine may be implemented in hardware or in software as a computer program implemented on a computer or on a computer program product, comprising a computer usable medium, such as hard disk drive or solid state memory, having a computer readable program code embodied therein. The invention is to be understood from the claims that follow.

The invention claimed is:

1. A method of yawing a rotor of a wind turbine, the method comprising:
   increasing a yaw speed of the rotor of the wind turbine, in a direction to reduce a yaw error, from a first speed to a faster second speed when at least one of a yaw error threshold and a rate of change in yaw error threshold is exceeded, the yaw error being an amount an axis about which the rotor is rotatable is offset from a wind direction to which the rotor is exposed.

2. The method according to claim 1, wherein the second speed is between substantially 3 times and substantially 20 times faster than the first speed.

3. The method according to claim 2, wherein the second speed is between substantially 5 times and 15 times faster than the first speed.

4. The method according to claim 3, wherein the second speed is substantially 10 times faster than the first speed.

5. The method according to claim 1, wherein the first speed is substantially 0.3 degrees per second.

6. The method according to claim 1, wherein blades of the rotor are pitchable to induce stall.

7. The method according to claim 1, comprising controlling at least one motor to increase the yaw speed of the rotor.

8. The method according to claim 7, wherein the at least one motor is an electric motor.

9. The method according to claim 1, wherein the yaw speed is increased to the faster second speed when the rate of change in the yaw error threshold is exceeded.

10. The method according to claim 1, wherein the yaw speed is increased to the faster second speed when both the yaw error threshold and the rate of change in yaw error threshold are exceeded.

11. The method according to claim 8 wherein the faster second speed is achieved by operating the electric motor above a rated speed of the electric motor.

12. A controller comprising:
   a processor; and
   a memory coupled to the processor and storing program code that, when executed by the processor, causes the controller to:
   increase a yaw speed of a rotor of a wind turbine, in a direction to reduce a yaw error, from a first speed to a faster second speed when at least one of a yaw error threshold and a rate of change in yaw error threshold is exceeded, the yaw error being an amount an axis about which the rotor is rotatable is offset from a wind direction to which the rotor is exposed.

13. A computer program product comprising:
   a non-transitory computer-readable medium; and
   program code stored on the non-transitory computer-readable medium that, when executed by a processor, causes the processor to:
   increase a yaw speed of a rotor of a wind turbine, in a direction to reduce a yaw error, from a first speed to a faster second speed when at least one of a yaw error threshold and a rate of change in yaw error threshold is exceeded, the yaw error being an amount an axis about which the rotor is rotatable is offset from a wind direction to which the rotor is exposed.

14. A wind turbine comprising:
   a rotor; and
   a controller including a processor and a memory coupled to the processor, the memory storing program code that, when executed by the processor, causes the controller to:
   increase a yaw speed of the rotor of the wind turbine, in a direction to reduce a yaw error, from a first speed to a faster second speed when at least one of a yaw error threshold and a rate of change in yaw error threshold is exceeded, the yaw error being an amount an axis about which the rotor is rotatable is offset from a wind direction to which the rotor is exposed.

15. A wind turbine comprising:
   a rotor; and
   a computer program product including:
   a non-transitory computer-readable medium, and
   program code stored on the non-transitory computer-readable medium that, when executed by a processor, causes the processor to:
   increase a yaw speed of the rotor of the wind turbine, in a direction to reduce a yaw error, from a first speed to a faster second speed when at least one of a yaw error threshold and a rate of change in yaw error threshold is exceeded, the yaw error being an amount an axis about which the rotor is rotatable is offset from a wind direction to which the rotor is exposed.

* * * * *